(12) United States Patent
Lee et al.

(10) Patent No.: US 9,695,919 B2
(45) Date of Patent: Jul. 4, 2017

(54) POWER TRANSMISSION APPARATUS FOR VEHICLE

(71) Applicant: Hyundai Motor Company, Seoul (KR)

(72) Inventors: Suengho Lee, Seoul (KR); Jongsool Park, Hwaseong-si (KR); Hyungwook Cho, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 201 days.

(21) Appl. No.: 14/552,124

(22) Filed: Nov. 24, 2014

(65) Prior Publication Data
US 2015/0184732 A1 Jul. 2, 2015

(30) Foreign Application Priority Data
Dec. 31, 2013 (KR) .................. 10-2013-0168485

(51) Int. Cl.
*B60K 6/48* (2007.10)
*F16H 37/04* (2006.01)
(Continued)

(52) U.S. Cl.
CPC .......... *F16H 37/046* (2013.01); *B60K 6/365* (2013.01); *B60K 6/48* (2013.01); *B60K 6/547* (2013.01); *F16H 3/006* (2013.01); *F16H 61/0403* (2013.01); *B60K 2006/4816* (2013.01); *B60K 2006/4841* (2013.01); *F16H 2003/0822* (2013.01); *F16H 2003/0931* (2013.01); *F16H 2037/048* (2013.01); *F16H 2200/0043* (2013.01); *F16H 2200/0082* (2013.01); *F16H 2200/2005* (2013.01); *Y02T 10/6221* (2013.01); *Y02T 10/6256* (2013.01); *Y10S 903/919* (2013.01)

(58) Field of Classification Search
None
See application file for complete search history.

(56) References Cited

U.S. PATENT DOCUMENTS 7,155,994 B2  1/2007  Gumpoltsberger
7,383,749 B2  6/2008  Schafer et al.
(Continued)

FOREIGN PATENT DOCUMENTS

JP  2008-18742 A   1/2008
JP  2010-149840 A  7/2010
(Continued)

*Primary Examiner* — Justin Holmes
(74) *Attorney, Agent, or Firm* — Morgan Lewis & Bockius LLP (57) ABSTRACT

A power transmission apparatus may include a first input shaft including at least one input gear, a second input shaft, at least one input gear. a first output shaft, more than two speed gears engaged respectively with the at least one input gear, at least one synchronizer operably connecting the more than two speed gears to the first output shaft selectively. a second output shaft, at least one speed gear engaged respectively with the at least one input gear, a reverse speed gear rotatably disposed on the second output shaft, at least one synchronizer operably connecting the at least one speed gear or the reverse speed gear to the second output shaft selectively, an idle shaft, and first and second idle gears fixedly disposed on the idle shaft and engaged respectively to one input gear on the first input shaft and the reverse speed gear.

18 Claims, 10 Drawing Sheets

(51) Int. Cl.
    *F16H 61/04*     (2006.01)
    *F16H 3/00*     (2006.01)
    *B60K 6/365*     (2007.10)
    *B60K 6/547*     (2007.10)
    *F16H 3/08*     (2006.01)
    *F16H 3/093*     (2006.01)

(56) References Cited

U.S. PATENT DOCUMENTS

| | | | |
|---|---|---|---|
| 8,784,245 B2 * | 7/2014 | Ideshio | B60K 6/36 475/5 |
| 2009/0280942 A1 | 11/2009 | Gumpoltsberger | |
| 2013/0196805 A1 * | 8/2013 | Phillips | B60K 6/445 475/5 |
| 2013/0337972 A1 * | 12/2013 | Lee | B60W 20/40 477/5 |

FOREIGN PATENT DOCUMENTS

| | | |
|---|---|---|
| KR | 10-1338458 B1 | 12/2013 |
| KR | 10-1339248 B1 | 12/2013 |
| WO | WO 2007/042109 A1 | 4/2007 |

* cited by examiner

| SPEED | CL1 | CL2 | SL1 | | | SL2 | | SL3 | | |
|---|---|---|---|---|---|---|---|---|---|---|
| | | | D1 | N | D3 | N | D2 | D4 | N | R |
| R RANGE | ● | | | (●) | | (●) | | | | ● |
| START AT R RANGE | | | | (●) | | (●) | | | | ● |
| N | | | | (●) | | (●) | | | (●) | |
| START AT D RANGE | | | ● | | | (●) | | | (●) | |
| FIRST FORWARD SPEED | ● | | ● | | | (●) | | | (●) | |
| SECOND FORWARD SPEED | | ● | | (●) | | | ● | | (●) | |
| THIRD FORWARD SPEED | ● | | | | ● | (●) | | | | |
| FOURTH FORWARD SPEED | | ● | | (●) | | (●) | | ● | | |

| SPEED | CL1 | CL2 | CL3 | SL1 | | | SL2 | | | SL3 | | NOTE |
|---|---|---|---|---|---|---|---|---|---|---|---|---|
| | | | | D1 | N | D3 | D2 | N | D4 | N | RG | |
| R RANGE | ● | | ● | | (●) | | | (●) | | | ● | ENGINE ON |
| START AT R RANGE | | | ● | | (●) | | | (●) | | | ● | |
| N | | | ● | | (●) | | | (●) | | (●) | | |
| START AT D RANGE | | | ● | ● | | | | (●) | | (●) | | |
| FIRST FORWARD SPEED | ● | | ● | ● | | | | (●) | | (●) | | |
| SECOND FORWARD SPEED | | ● | ● | | (●) | | ● | | | (●) | | |
| THIRD FORWARD SPEED | ● | | ● | | | ● | | (●) | | (●) | | |
| FOURTH FORWARD SPEED | | ● | ● | | (●) | | | (●) | ● | | | |
| EV R RANGE | ● | | | | (●) | | | (●) | | | ● | ENGINE OFF MOTOR ON |
| EV D RANGE | ● | | | | | ● | | (●) | | (●) | | ENGINE OFF MOTOR ON |

POWER TRANSMISSION APPARATUS FOR VEHICLE

CROSS-REFERENCE TO RELATED APPLICATION

The present application claims priority to and the benefit of Korean Patent Application No. 10-2013-0168485 filed on Dec. 31, 2013, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle that realizes smooth start and shift and improves fuel economy and acceleration performance by adding a plurality of power sources and a torque changing device to a double clutch transmission.

Description of Related Art

Environmentally-friendly technique of vehicles is very important technique on which survival of future motor industry is dependent. Vehicle makers are focusing on development of environmentally-friendly vehicles to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system to meet exhaust regulation of countries and improve fuel consumption performance. To improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of realizing smooth start and shift by adding a plurality of power sources and a torque changing device to a double clutch transmission, of improving fuel mileage by realizing regenerative braking, and of improving acceleration performance by using torque of a motor/generator when acceleration.

A power transmission apparatus for a vehicle according to one or more exemplary embodiments of the present invention may include, an input device including a first input shaft selectively receiving torque from a plurality of power sources and provided with at least one input gear fixedly disposed thereon, and a second input shaft disposed concentrically with the first input shaft, selectively receiving torque from the plurality of power sources, and provided with at least one input gear fixedly disposed thereon. a first speed output unit including a first output shaft disposed in parallel with the first and second input shafts, more than two speed gears engaged respectively with the at least one input gear on the first and second input shafts and rotatably disposed on the first output shaft, and at least one synchronizer operably connecting the more than two speed gears to the first output shaft selectively. a second speed output unit including a second output shaft disposed in parallel with the first and second input shafts, at least one speed gear engaged respectively with the at least one input gear on the first and second input shafts and rotatably disposed on the second output shaft, a reverse speed gear rotatably disposed on the second output shaft, and at least one synchronizer operably connecting the at least one speed gear or the reverse speed gear to the second output shaft selectively; and. a reverse speed output unit including an idle shaft disposed in parallel with the second input shaft, and first and second idle gears fixedly disposed on the idle shaft and engaged respectively to one input gear on the first input shaft and the reverse speed gear.

The plurality of power sources may be an engine and a motor/generator.

In some exemplary embodiments, the input device may include, the first input shaft directly receiving or selectively receiving through a first clutch the torque from the plurality of power sources; and. the second input shaft disposed without rotational interference with the first input shaft, selectively receiving the torque from one power source among the plurality of power sources through a second clutch, and provided with a first input gear disposed thereon, wherein second, third, and fourth input gears are sequentially disposed on the first input shaft.

The first speed output unit may include, the first output shaft disposed in parallel with the first and second input shafts. a first speed gear engaged with the second input gear and rotatably disposed on the first output shaft. a second speed gear engaged with the first input gear and rotatably disposed on the first output shaft. a third speed gear engaged with the fourth input gear and rotatably disposed on the first output shaft. a first synchronizer operably connecting the first speed gear or the third speed gear to the first output shaft selectively; and. a second synchronizer operably connecting the second speed gear to the first output shaft selectively.

The second speed output unit may include, the second output shaft disposed in parallel with the first and second input shafts. a fourth speed gear engaged with the first input gear and rotatably disposed on the second output shaft. the reverse speed gear operably connected to the reverse speed output unit and rotatably disposed on the second output shaft; and. a third synchronizer operably connecting the fourth speed gear or the reverse speed gear to the second output shaft selectively.

The reverse speed output unit may include, the idle shaft disposed in parallel with the second input shaft. the first idle gear engaged with the third input gear and fixedly disposed on the idle shaft; and. the second idle gear engaged with the reverse speed gear and fixedly disposed on the idle shaft.

In some exemplary embodiments, the input device may include, the first input shaft directly receiving or selectively receiving through a first clutch the torque from the plurality of power sources and provided with first, second, and third input gears sequentially disposed thereon; and. the second input shaft disposed without rotational interference with the first input shaft, selectively receiving the torque from one power source among the plurality of power sources through a second clutch, and provided with a fourth input gear.

The first speed output unit may include, the first output shaft disposed in parallel with the first and second input shafts. a first speed gear engaged with the third input gear and rotatably disposed on the first output shaft. a second speed gear engaged with the fourth input gear and rotatably disposed on the first output shaft. a third speed gear engaged with the first input gear and rotatably disposed on the first output shaft. a first synchronizer operably connecting the first speed gear or the third speed gear to the first output shaft selectively; and. a second synchronizer operably connecting the second speed gear to the first output shaft selectively.

The second speed output unit may include, the second output shaft disposed in parallel with the first and second input shafts. a fourth speed gear engaged with the fourth input gear and rotatably disposed on the second output shaft. the reverse speed gear operably connected to the reverse speed output unit and rotatably disposed on the second output shaft; and. a third synchronizer operably connecting the fourth speed gear or the reverse speed gear to the second output shaft selectively.

The reverse speed output unit may include, the idle shaft disposed in parallel with the second input shaft. the first idle gear engaged with the second input gear and fixedly disposed on the idle shaft; and. the second idle gear engaged with the reverse speed gear and fixedly disposed on the idle shaft.

The power transmission apparatus may further include a torque changing device being a planetary gear set having first, second, and third rotation elements, changing the torque from the plurality of power sources, and directly transmitting changed torque to the first input shaft of the input device or selectively transmitting the changed torque to the first input shaft or the second input shaft.

In some exemplary embodiments, the torque changing device may be a double pinion planetary gear set including a sun gear being the first rotation element and directly connected to one power source, a planet carrier being the second rotation element, directly connected to another power source, and selectively connected to the first and second input shafts respectively through first and second clutches, and a ring gear being the third rotation element and directly connected to the first input shaft.

In some exemplary embodiments, the torque changing device may be a double pinion planetary gear set including a planet carrier being the first rotation element and directly connected to one power source, a sun gear being the second rotation element, directly connected to another power source, and selectively connected to the first and second input shafts respectively through first and second clutches, and a ring gear being the third rotation element and directly connected to the first input shaft.

In some exemplary embodiments, the torque changing device may be a single pinion planetary gear set including a sun gear being the first rotation element and directly connected to one power source, a ring gear being the second rotation element, directly connected to another power source, and selectively connected to the first and second input shafts respectively through first and second clutches, and a planet carrier being the third rotation element and directly connected to the first input shaft.

In some exemplary embodiments, the torque changing device may be a single pinion planetary gear set including a ring gear being the first rotation element and directly connected to one power source, a sun gear being the second rotation element, directly connected to another power source, and selectively connected to the first and second input shafts respectively through first and second clutches, and a planet carrier being the third rotation element and directly connected to the first input shaft.

In some exemplary embodiments, the torque changing device may be a double pinion planetary gear set including a sun gear being the first rotation element and directly connected to one power source, a planet carrier being the second rotation element, selectively connected to another power source, and selectively connected to the first and second input shafts respectively through first and second clutches, and a ring gear being the third rotation element and directly connected to the first input shaft, wherein a third clutch is disposed between the second rotation element and the another power source.

In some exemplary embodiments, the torque changing device is a double pinion planetary gear set including a planet carrier being the first rotation element and directly connected to one power source, a sun gear being the second rotation element, selectively connected to another power source, and selectively connected to the first and second input shafts respectively through first and second clutches, and a ring gear being the third rotation element and directly connected to the first input shaft, wherein a third clutch is disposed between the second rotation element and the another power source.

In some exemplary embodiments, the torque changing device is a single pinion planetary gear set including a sun gear being the first rotation element and directly connected to one power source, a ring gear being the second rotation element, selectively connected to another power source, and selectively connected to the first and second input shafts respectively through first and second clutches, and a planet carrier being the third rotation element and directly connected to the first input shaft, wherein a third clutch is disposed between the second rotation element and the another power source.

In some exemplary embodiments, the torque changing device is a single pinion planetary gear set including a ring gear being the first rotation element and directly connected to one power source, a sun gear being the second rotation element, selectively connected to another power source, and selectively connected to the first and second input shafts respectively through first and second clutches, and a planet carrier being the third rotation element and directly connected to the first input shaft, wherein a third clutch is disposed between the second rotation element and the another power source.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
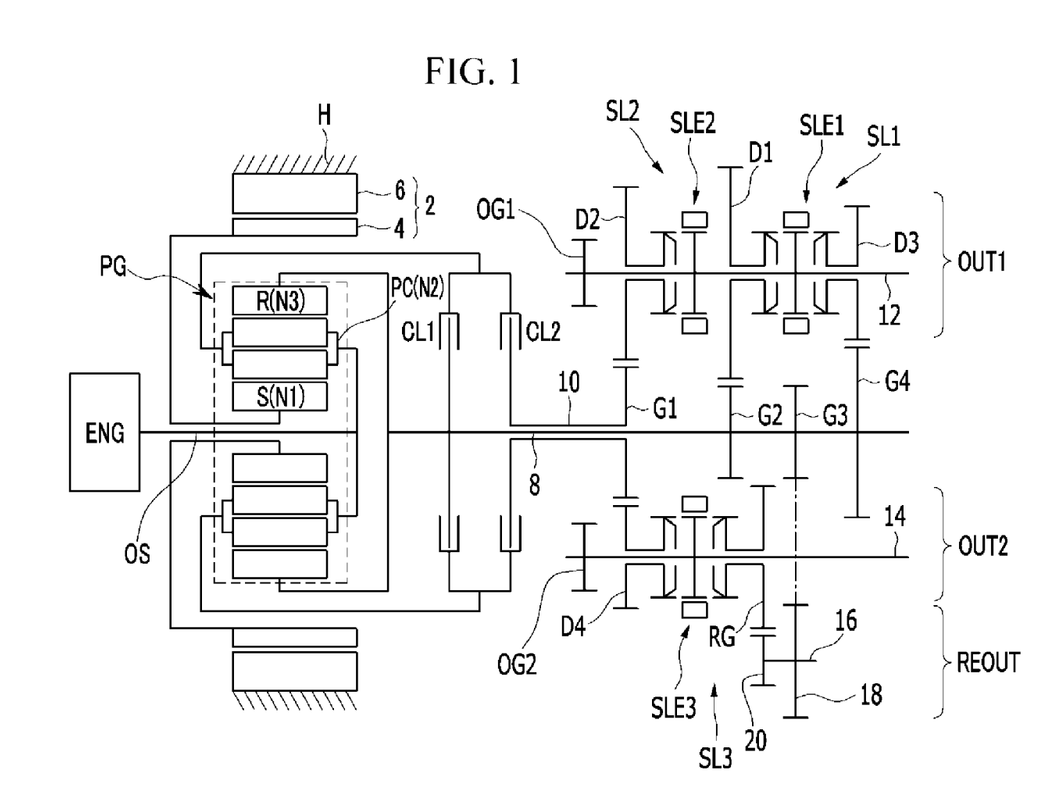
FIG. 1 is a schematic diagram of a power transmission apparatus for a vehicle according to the various exemplary embodiments of the present invention.

FIG. 1 is a schematic diagram of a power transmitting apparatus according to the first exemplary embodiment of the present invention.

Referring to FIG. 1, a power transmission apparatus according to the first exemplary embodiment of the present invention includes an engine ENG and a motor/generator 2 used as two power sources, a torque changing device, input device, first and second speed output units OUT1 and OUT2, and a reverse speed output unit REOUT.

The engine ENG may be a typical internal combustion engine, and an output shaft OS of the engine ENG is connected to any one rotation element of the torque changing device.

In addition, the motor/generator 2 includes a rotor 4 and a stator 6, and can be operated as a motor and a generator. The rotor 4 is connected to another rotation element of the torque changing device and the stator 6 is connected to a transmission housing H.

The torque changing device may be a planetary gear set PG. In the first exemplary embodiment of the present invention, a double pinion planetary gear set having three rotation elements may be used as the torque changing device.

The three rotation element includes a first rotation element N1 being a sun gear S, a second rotation element N2 being a planet carrier PC, and a third rotation element N3 being a ring gear R.

The first rotation element N1 is connected to the rotor 4 to receive torque of the rotor 4 or to transmit torque to the rotor 4.

The second rotation element N2 is directly connected to the output shaft OS of the engine ENG that is the power source to be operated as an input element, and transmits torque to the input device.

The third rotation element N3 transmits torque to the input device.

The input device includes a first input shaft 8 and a second input shaft 10.

A front end portion of the first input shaft 8 is selectively connected to the second rotation element N2 of the torque changing device directly connected to the engine ENG, and is directly connected to the third rotation element N3.

The second input shaft 10 is a hollow shaft, and the first input shaft 8 is inserted into the second input shaft 10 without rotational interference therebetween. A front end portion of the second input shaft 10 is selectively connected to the second rotation element N2 of the torque changing device directly connected to the engine ENG.

A first input gear G1 is disposed on the second input shaft 10, and second, third, and fourth input gears G2, G3, and G4 are disposed on the first input shaft 8 and are spaced with predetermined distances.

The second, third, and fourth input gears G2, G3, and G4 are positioned at a rear end portion of the first input shaft 8 penetrating through the second input shaft 10, and are sequentially disposed from a front end to a rear end.

The first, second, third, and fourth input gears G1, G2, G3, and G4 are input gears operating at each speed. That is, the first input gear G1 is an input gear for achieving a second forward speed and a fourth forward speed, the second input gear G2 is an input gear for achieving a first forward speed, the third input gear G3 is an input gear for achieving a reverse speed, and the fourth input gear G4 is an input gear for achieving a third forward speed.

That is, input gears for achieving odd-numbered speeds are disposed on the first input shaft 8, and an input gear for achieving even-numbered speeds and the reverse speed is disposed on the second input shaft 10.

In addition, the input device is selectively connected to the torque changing device through a first clutch CL1 and a second clutch CL2.

The first clutch CL1 is disposed between the first input shaft 8 and the second rotation element N2 to selectively direct-couple the planetary gear set PG that is the torque changing device and to selectively transmit torque of the torque changing device to the first input shaft 8.

The second clutch CL2 is disposed between the second input shaft 10 and the second rotation element N2 to selectively transmit the torque of the torque changing device to the second input shaft 10.

The first and second clutches CL1 and CL2 are conventional multi-plate clutches of wet type and may be controlled by a hydraulic control system. Multi-plate clutches of dry type may be used as the first and second clutches CL1 and CL2.

The first and second speed output units OUT1 and OUT2 and the reverse speed output unit REOUT that receive torque from the input gears of the input device and change and output the received torque is disposed in parallel with and apart from the first and second input shafts 8 and 10.

The first speed output unit OUT1 includes a first output shaft 12, first, second, and third speed gears D1, D2, and D3 rotatably disposed on the first output shaft 12, and first and second synchronizers SL1 and SL2.

The first output shaft 12 is disposed in parallel with and apart from the first and second input shafts 8 and 10.

The first speed gear D1 is engaged with the second input gear G2, the second speed gear D2 is engaged with the first input gear G1, and the third speed gear D3 is engaged with the fourth input gear G4.

In addition, the first synchronizer SL1 operably connects the first or third speed gear D1 and D3 to the first output shaft 12 selectively, and the second synchronizer SL2 operably connects the second speed gear D2 to the first output shaft 12 selectively.

In addition, the torque converted by the first speed output unit OUT1 is transmitted to a differential apparatus through a first output gear OG1 fixedly disposed on a front end portion or a rear end portion of the first output shaft 12.

The second speed output unit OUT2 includes a second output shaft 14, a fourth speed gear D4 and a reverse speed gear RG rotatably disposed on the second output shaft 14, and a third synchronizer SL3.

The second output shaft 14 is disposed in parallel with and apart from the first and second input shafts 8 and 10.

The fourth speed gear D4 is engaged with the second input gear G2 and the reverse speed gear RG is operably connected to the reverse speed output unit REOUT.

In addition, third synchronizer SL3 operably connects the fourth speed gear D4 or the reverse speed gear RG to the second output shaft 14 selectively.

In addition, the torque converted by the second speed output unit OUT2 is transmitted to the differential apparatus through a second output gear OG2 fixedly disposed on a front end portion or a rear end portion of the second output shaft 14.

The reverse speed output unit REOUT includes an idle shaft 16, a first idle gear 18 of large diameter, and a second idle gear 20 of small diameter.

The idle shaft 16 is disposed in parallel with the second output shaft 14, the first idle gear 18 is engaged with the third input gear G3, and the second idle gear 20 is engaged with the reverse speed gear RG.

Therefore, torque from the third input gear G3 is transmitted to the reverse speed gear RG through the first idle gear 18 and the second idle gear 20 at the reverse speed, and rotating direction changes in this process. Torque transmitted from the reverse speed gear RG is transmitted to the differential apparatus through the second output gear OG2 fixedly disposed on the front end portion or the rear end portion of the second output shaft 14.

Since the first, second, and third synchronizers SL1, SL2, and SL3 are well known to a person of an ordinary skill in the art, detailed description thereof will be omitted. In addition, first, second, and third sleeves SLE1, SLE2, and SLE3 applied respectively to the first, second, and third synchronizers SL1, SL2, and SL3, as well known to a person of an ordinary skill in the art, are operated by additional actuators and the actuators are controlled by a transmission control unit.

Figure 2:
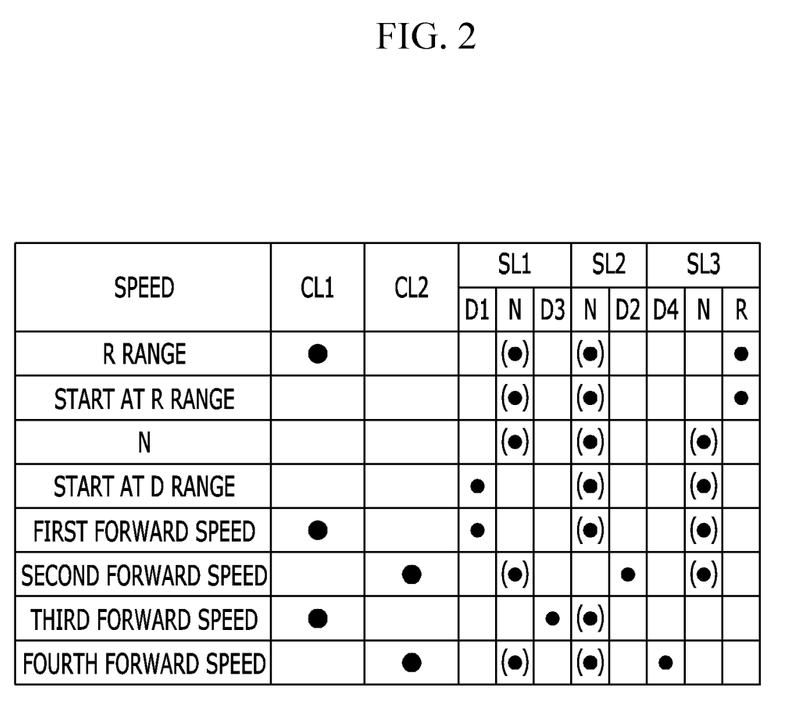
FIG. 2 is an operational chart of a power transmission apparatus for a vehicle according to the various exemplary embodiments of the present invention.

FIG. 2 is an operational chart of a power transmitting apparatus according to the first exemplary embodiment of the present invention.

Referring to FIG. 2, the first clutch CL1 is operated at the reverse speed and the odd-numbered speeds, and the second clutch CL2 is operated at the even-numbered speeds.

[Neutral]

At a neutral N range, none of the first and second clutches CL1 and CL2 is operated, sleeves SLE1-SLE3 of the first to third synchronizers SL1-SL3 stay at their neutral positions.

At the neutral range, the second output shaft 14 and the reverse speed gear RG can be operably connected (start at R range). That is, the engine ENG or the motor/generator 2 can be started before the reverse speed R is achieved.

In addition, at the neutral range, the first output shaft 12 and the first speed gear D1 can be operably connected (start at D range). That is, the engine ENG or the motor/generator 2 can be started before the first forward speed is achieved.

In addition, a battery can be charged at the neutral N range. In this case, the first clutch CL1 is operated to direct-couple the planetary gear set PG and the torque of the engine is transmitted to the rotor 4 to charge the battery.

[Reverse Speed]

At the neutral N range, the second output shaft 14 and the reverse speed gear RG are operably connected through the sleeve SLE3 of the third synchronizer SL3. In this case, start at the reverse speed R can be achieved. At this state, when the first clutch CL1 is operated, the reverse speed R is achieved.

[First Forward Speed]

At the neutral N range, the first output shaft 12 and the first speed gear D1 are operably connected through the sleeve SLE1 of the first synchronizer SL1. After that, when the first clutch CL1 is operated, the first forward speed is achieved.

At this time, the first output shaft 12 and the second speed gear D2 may be operably connected through the sleeve SLE2 of the second synchronizer SL2 for a next shift to the second forward speed.

[Second Forward Speed]

If the first output shaft 12 and the second speed gear D2 are operably connected through the sleeve SLE2 of the second synchronizer SL2, the first clutch CL1 is released, and the second clutch CL2 is operated at the first forward speed, the second forward speed is achieved.

At this time, the sleeve SLE1 of the first synchronizer SL1 returns to its neutral position, and the first output shaft 12 and the third speed gear D3 may be operably connected through the sleeve SLE1 of the first synchronizer SL1 for a next shift to the third forward speed.

[Third Forward Speed]

If the first output shaft 12 and the third speed gear D3 are operably connected through the sleeve SLE1 of the first synchronizer SL1, the second clutch CL2 is released, and the first clutch CL1 is operated at the second forward speed, the third forward speed is achieved.

At this time, the sleeve SLE2 of the second synchronizer SL2 returns to its neutral position, and the second output shaft 14 and the fourth speed gear D4 may be operably connected through the sleeve SLE3 of the third synchronizer SL3 for a next shift to the fourth forward speed.

[Fourth Forward Speed]

If the second output shaft 14 and the fourth speed gear D4 are operably connected through the sleeve SLE3 of the third synchronizer SL3, the first clutch CL1 is released, and the second clutch CL2 is operated at the third forward speed, the fourth forward speed is achieved.

In addition, when the motor/generator 2 is operated at the state that the first clutch CL1 is released, the torque changing device changes and outputs torque according to rotation speeds of the motor/generator 2 and the engine ENG.

In addition, regenerative braking can be executed by using the motor/generator 2 when the vehicle runs at a forward speed or the reverse speed.

The first exemplary embodiment of the present invention can achieve smooth start and shift by using the engine (or the engine and the motor/generator) and the planetary gear set PG that is the torque changing device.

In addition, slip of the clutch may be minimized and fuel mileage may improve because regenerative braking is executed when deceleration.

In addition, since the torque of the motor/generator 2 assists driving of the vehicle when acceleration, acceleration performance may improve.

Figure 3:
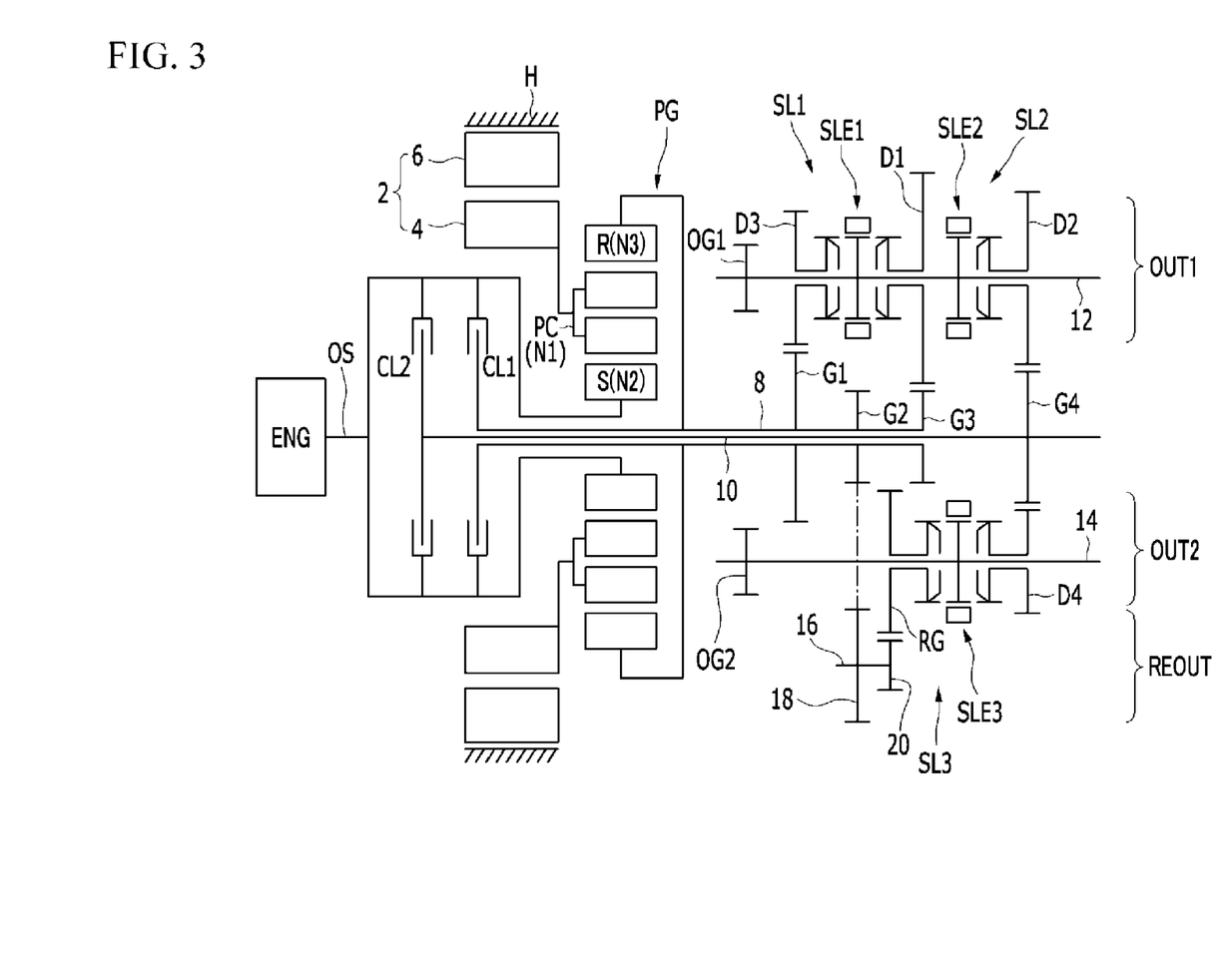
FIG. 3 is a schematic diagram of a power transmission apparatus for a vehicle according to the various exemplary embodiments of the present invention.

FIG. 3 is a schematic diagram of a power transmission apparatus for a vehicle according to the second exemplary embodiment of the present invention.

Referring to FIG. 3, the first input shaft 8 is a hollow shaft and the second input shaft 10 is inserted into the first input shaft 8 without rotational interference therebetween according to the second exemplary embodiment of the present invention.

In addition, the first, second, and third input gears G1, G2, and G3 are sequentially disposed on the first input shaft 8 from the front end to the rear end, and the fourth input gear G4 is disposed on the second input shaft 10 according to the second exemplary embodiment of the present invention.

In addition, the third, first, and second speed gears D3, D1, and D2 are sequentially disposed on the first output shaft 12 and are engaged respectively to the first, third, and fourth input gears G1, G3, and G4. The reverse speed gear RG and the fourth speed gear D4 are sequentially disposed on the second output shaft 14, and the fourth speed gear D4 is engaged with the fourth input gear G4.

In addition, the second idle gear 20 of the reverse speed output unit REOUT is engaged with the second input gear G2.

In addition, the planetary gear set PG that is the torque changing device is a double pinion planetary gear set, the planet carrier PC is set as the first rotation element N1, the sun gear S is set as the second rotation element N2, and the ring gear R is set as the third rotation element N3.

At this time, the first clutch CL1 is disposed between the sun gear S and the first input shaft 8, and the second clutch CL2 is disposed between the sun gear S and the second input shaft 10.

The second exemplary embodiment of the present invention are similar to the first exemplary embodiment except arrangement of the first and second input shafts 8 and 10, positions of the input gears and the speed gears, and constituent elements including the rotation elements of the planetary gear set PG. Therefore, detailed description thereof will be omitted.

Figure 4:
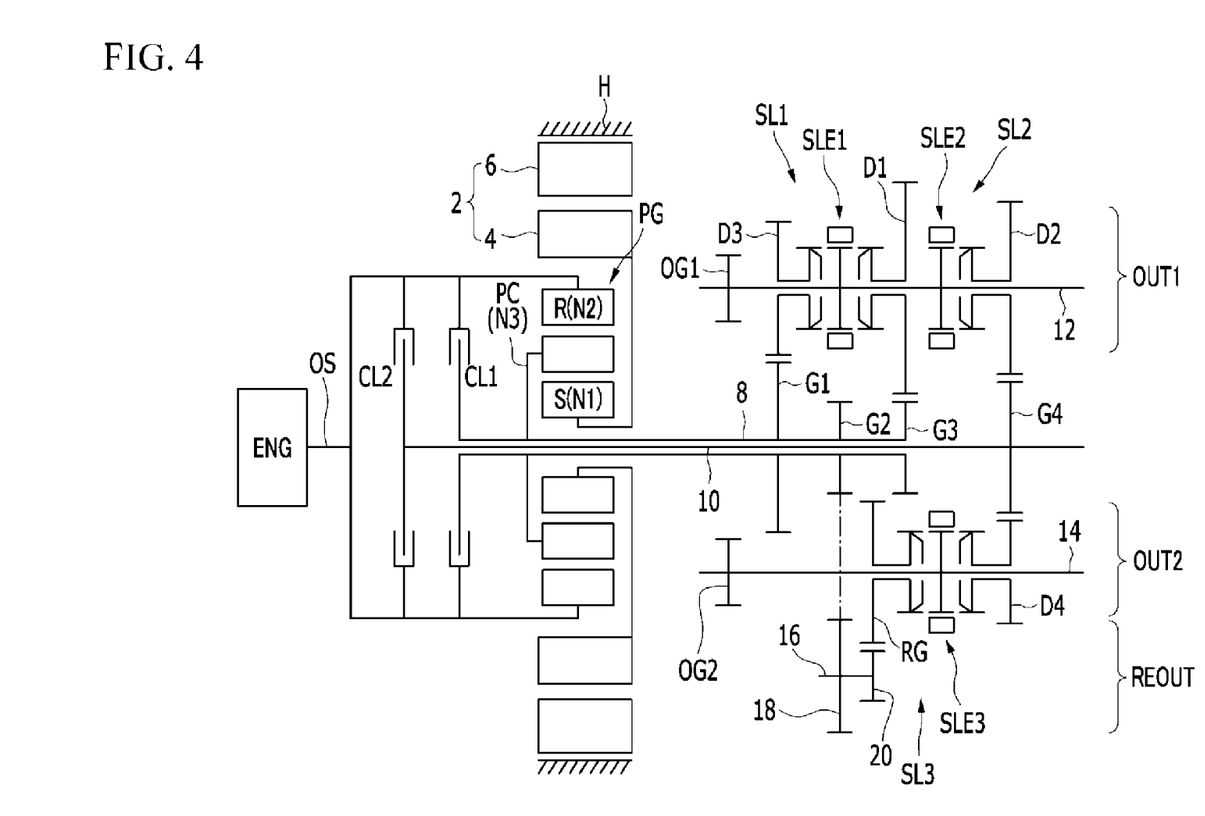
FIG. 4 is a schematic diagram of a power transmission apparatus for a vehicle according to the various exemplary embodiments of the present invention.

FIG. 4 is a schematic diagram of a power transmission apparatus for a vehicle according to the third exemplary embodiment of the present invention.

Referring to FIG. 4, the planetary gear set PG that is the torque changing device is a single pinion planetary gear set in the power transmission apparatus for a vehicle according to the third exemplary embodiment of the present invention.

That is, according to the third exemplary embodiment of the present invention, the sun gear S is set as the first rotation element, the ring gear R is set as the second rotation element, and the planet carrier PC is set as the third rotation element.

At this time, the first clutch CL1 is disposed between the ring gear R and the first input shaft 8 and the second clutch CL2 is disposed between the ring gear R and the second input shaft 10.

The third exemplary embodiment of the present invention are similar to the first exemplary embodiment except arrangement of the first and second input shafts 8 and 10, positions of the input gears and the speed gears, and constituent elements including the rotation elements of the planetary gear set PG. Therefore, detailed description thereof will be omitted.

Figure 5:
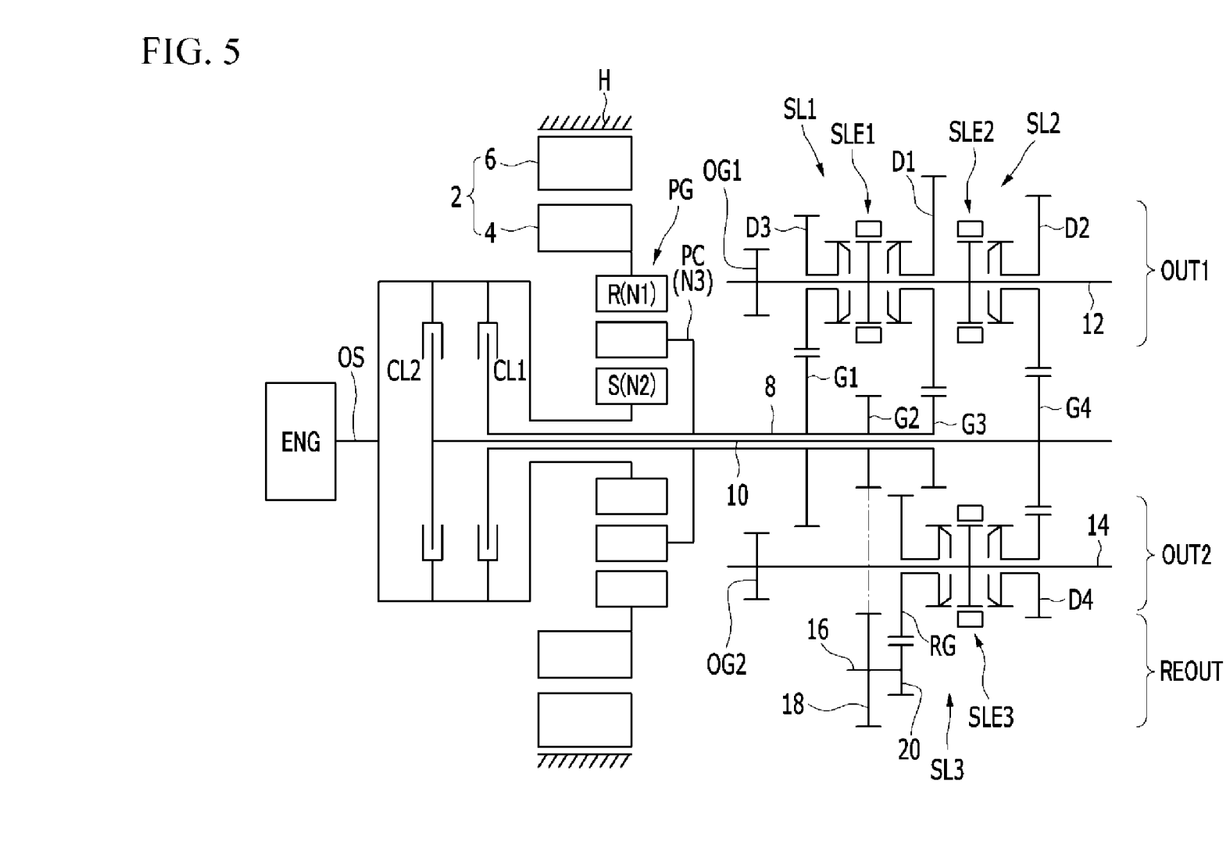
FIG. 5 is a schematic diagram of a power transmission apparatus for a vehicle according to the various exemplary embodiments of the present invention.

FIG. 5 is a schematic diagram of a power transmission apparatus for a vehicle according to the fourth exemplary embodiment of the present invention.

Referring to FIG. 5, the planetary gear set PG that is the torque changing device is a single pinion planetary gear set in the power transmission apparatus for a vehicle according to the fourth exemplary embodiment of the present invention.

That is, according to the fourth exemplary embodiment of the present invention, the ring gear R is set as the first rotation element, the sun gear S is set as the second rotation element, and the planet carrier PC is set as the third rotation element.

At this time, the first clutch CL1 is disposed between the sun gear S and the first input shaft 8 and the second clutch CL2 is disposed between the sun gear S and the second input shaft 10.

The fourth exemplary embodiment of the present invention are similar to the first exemplary embodiment except arrangement of the first and second input shafts 8 and 10, positions of the input gears and the speed gears, and constituent elements including the rotation elements of the planetary gear set PG. Therefore, detailed description thereof will be omitted.

Figure 6:
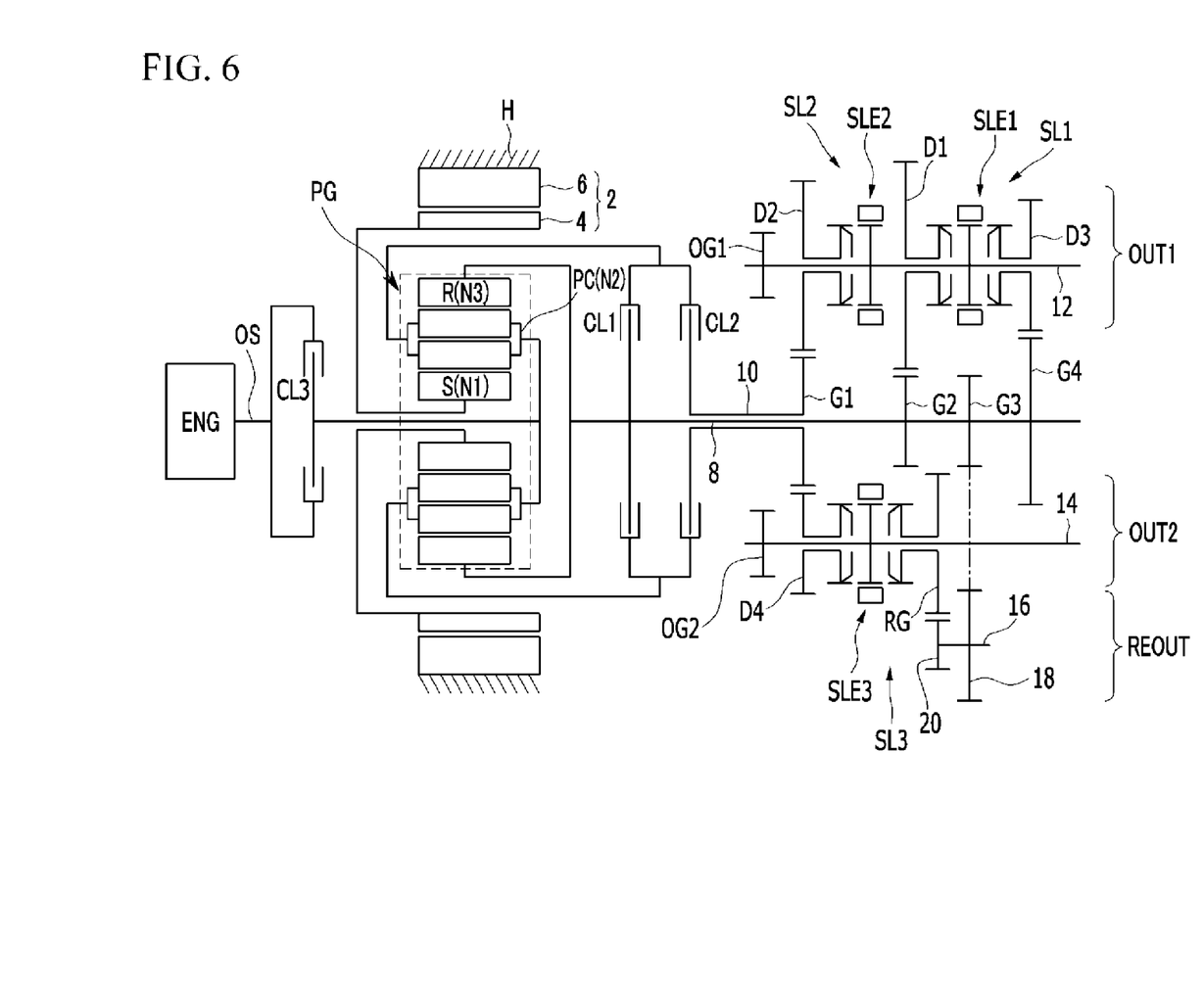
FIG. 6 is a schematic diagram of a power transmission apparatus for a vehicle according to the various exemplary embodiments of the present invention.
Figure 7:
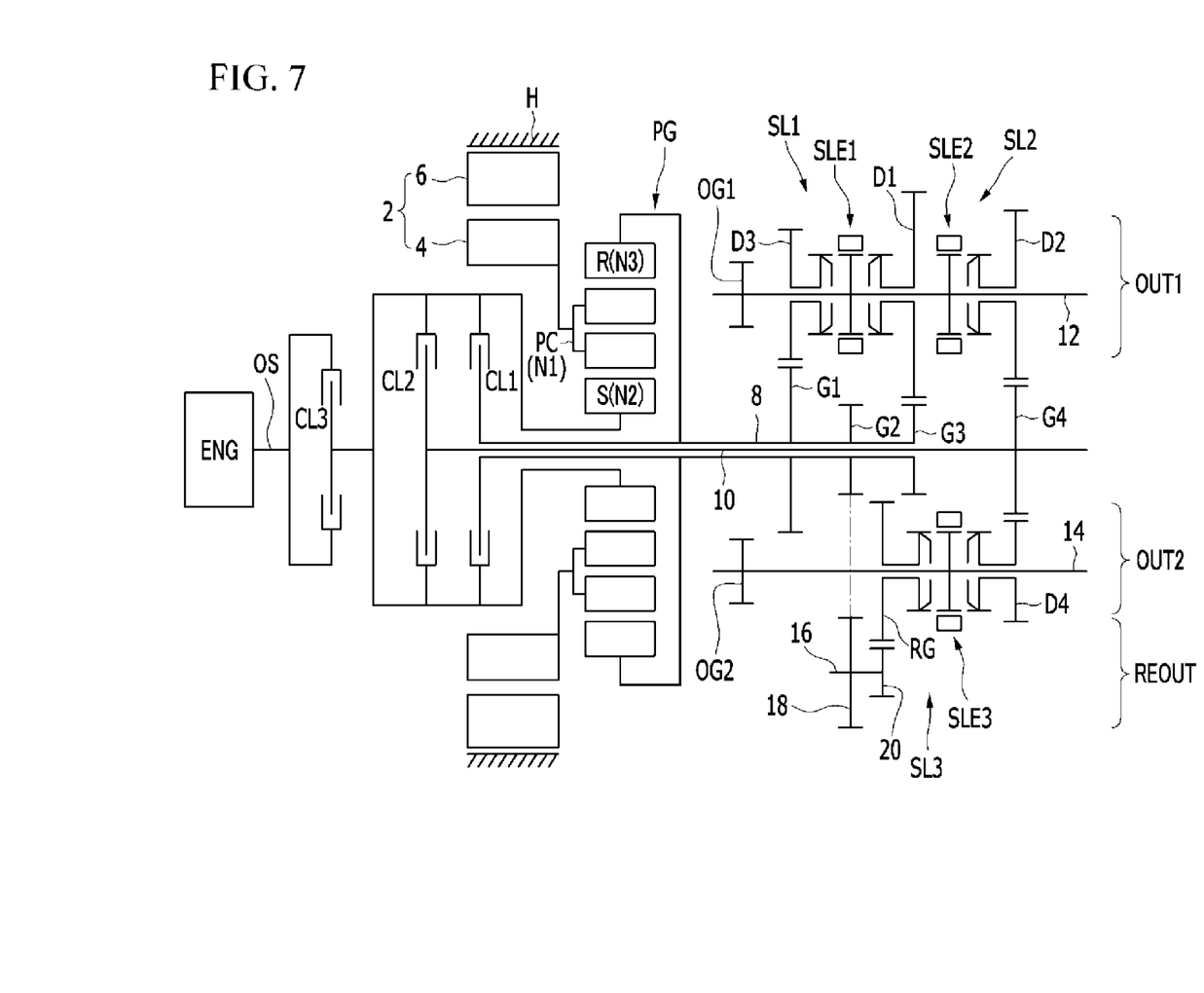
FIG. 7 is a schematic diagram of a power transmission apparatus for a vehicle according to the various exemplary embodiments of the present invention.
Figure 8:
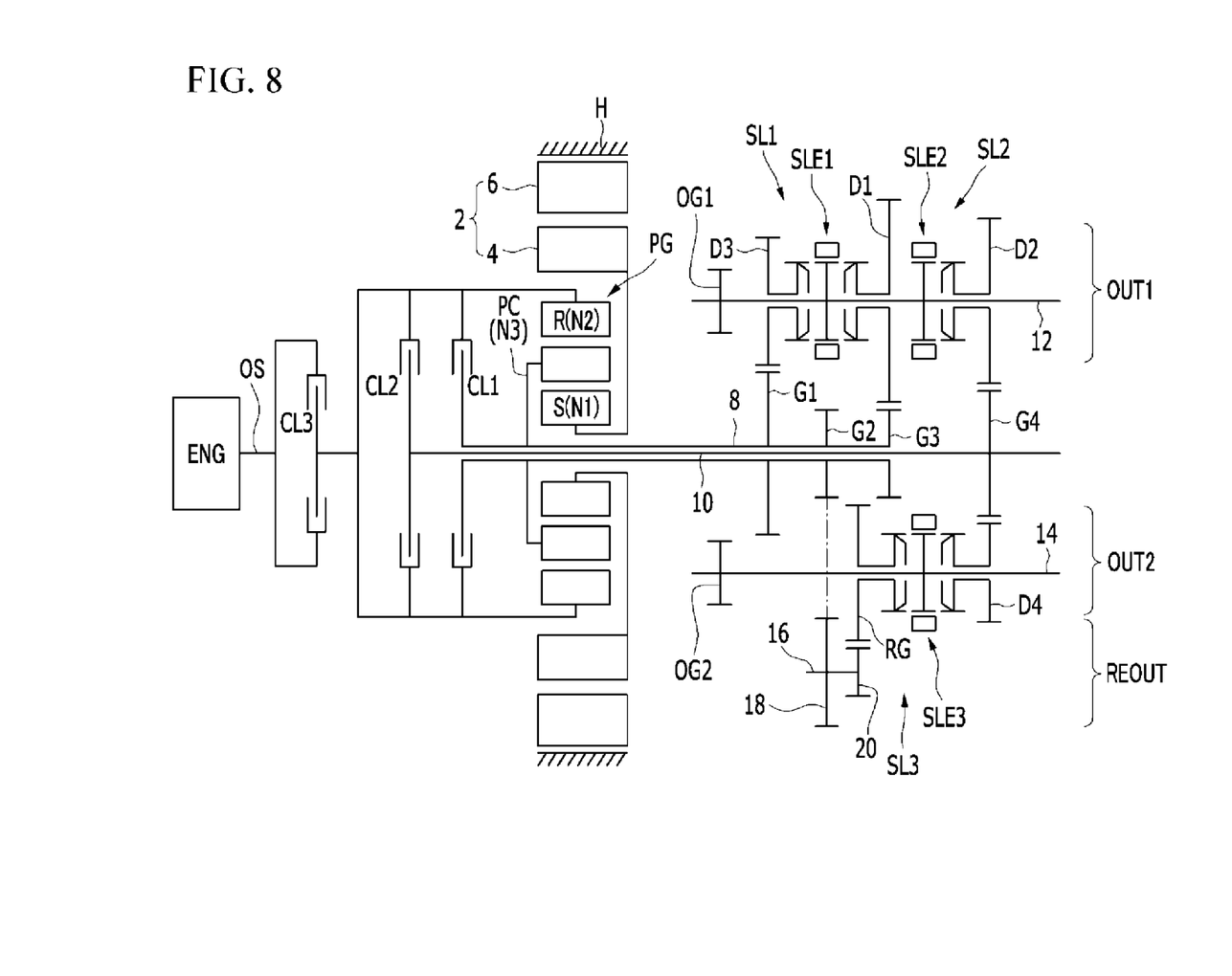
FIG. 8 is a schematic diagram of a power transmission apparatus for a vehicle according to the seventh exemplary embodiment of the present invention.
Figure 9:
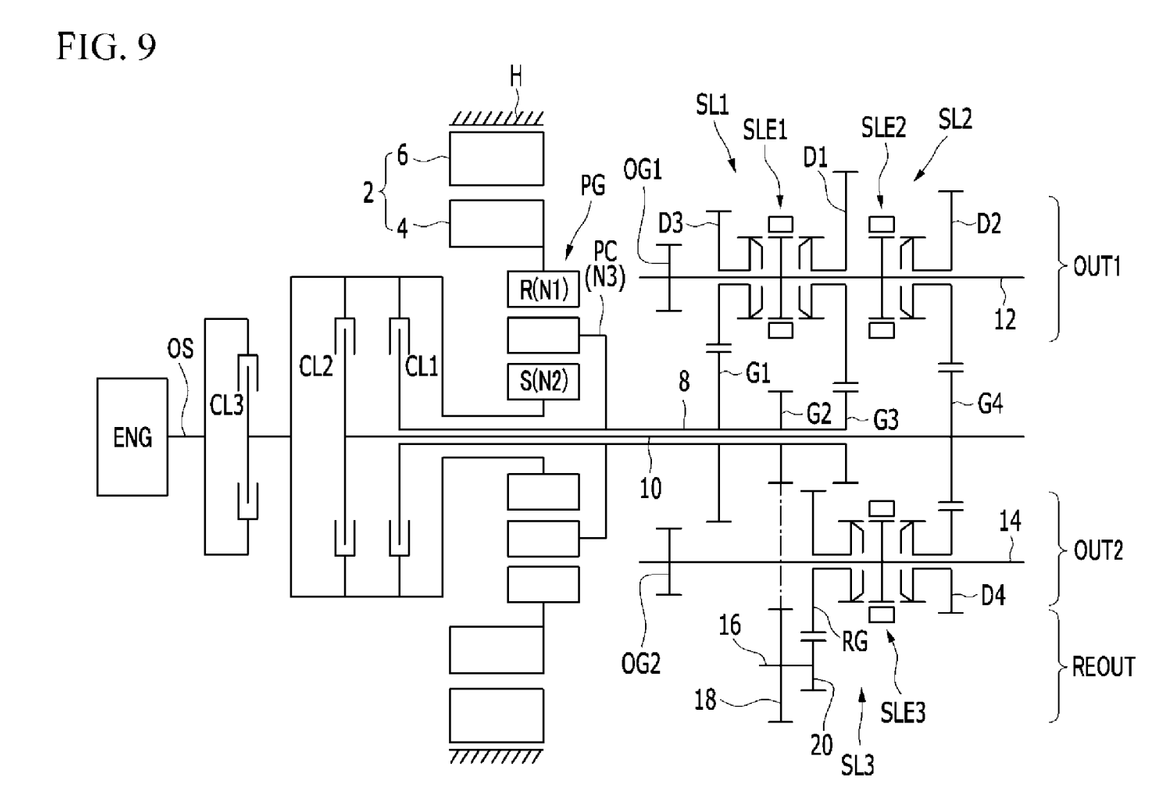
FIG. 9 is a schematic diagram of a power transmission apparatus for a vehicle according to the eighth exemplary embodiment of the present invention.
Figure 10:
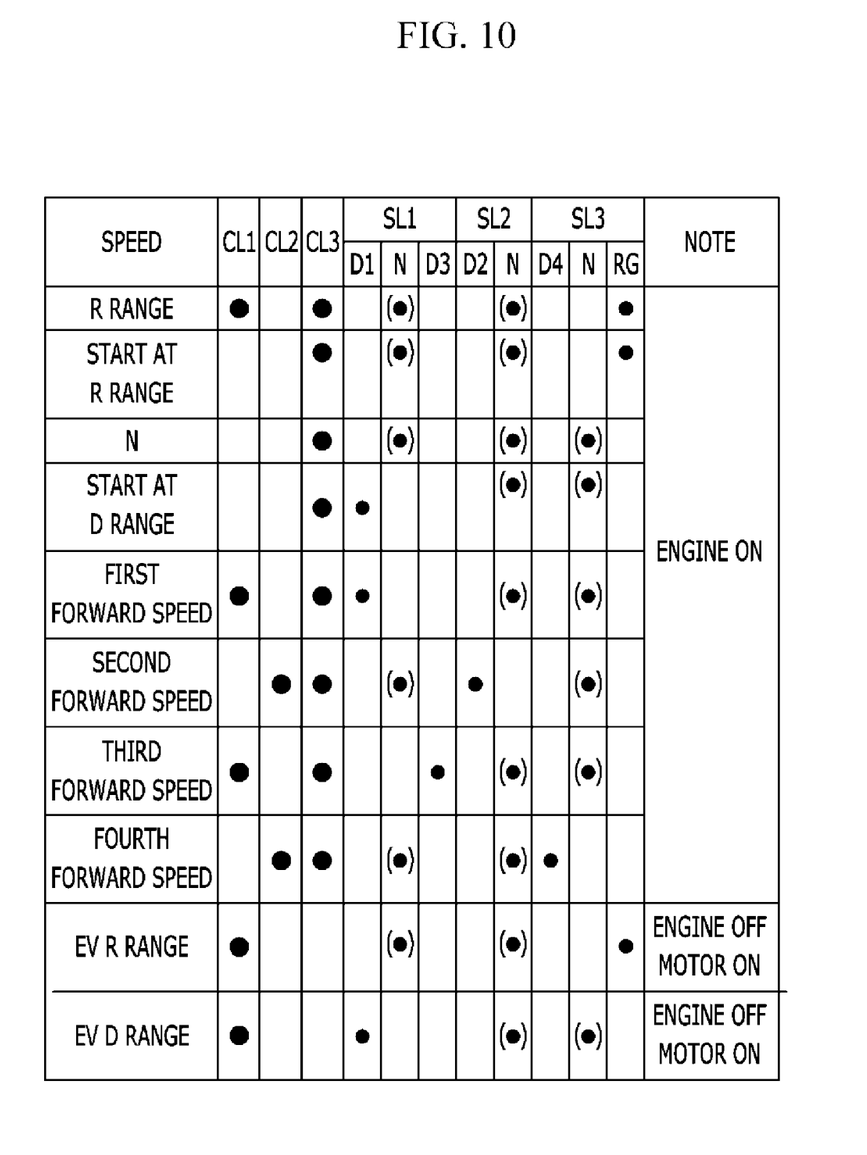
FIG. 10 is an operational chart of a power transmission apparatus for a vehicle according to the fifth, sixth, seventh, and eighth exemplary embodiments of the present invention.

FIG. 6 is a schematic diagram of a power transmission apparatus for a vehicle according to the fifth exemplary embodiment of the present invention. FIG. 7 is a schematic diagram of a power transmission apparatus for a vehicle according to the sixth exemplary embodiment of the present invention. FIG. 8 is a schematic diagram of a power transmission apparatus for a vehicle according to the seventh exemplary embodiment of the present invention. FIG. 9 is a schematic diagram of a power transmission apparatus for a vehicle according to the eighth exemplary embodiment of the present invention; and. FIG. 10 is an operational chart of a power transmission apparatus for a vehicle according to the fifth, sixth, seventh, and eighth exemplary embodiments of the present invention.

Referring to FIG. 6 to FIG. 9, the engine ENG and the motor/generator 2 that are two power sources, the torque changing device, the input device, the first and second speed output units OUT1 and OUT2, and the reverse speed output unit REOUT according to the fifth, sixth, seventh, and eighth exemplary embodiments of the present invention are the same as those of the first, second, third, and fourth exemplary embodiments.

However, a third clutch CL3 selectively transmitting the torque of the engine ENG to the torque changing device is further included.

That is, the third clutch CL3 is additionally disposed between the engine ENG and the planet carrier PC of the planetary gear set PG in the fifth exemplary embodiment, compared with the first exemplary embodiment, the third clutch CL3 is additionally disposed between the engine ENG and the sun gear S of the planetary gear set PG in the sixth exemplary embodiment, compared with the second exemplary embodiment, the third clutch CL3 is additionally disposed between the engine ENG and the ring gear R of the planetary gear set PG in the seventh exemplary embodiment, compared with the third exemplary embodiment, and the third clutch CL3 is additionally disposed between the engine ENG and the sun gear S of the planetary gear set PG in the eighth exemplary embodiment, compared with the fourth exemplary embodiment.

Therefore, the vehicle can drive at an "EV R" range and an "EV D" range using the motor/generator 2 in a state that the engine ENG is stopped according to the fifth, sixth, seventh, and eighth exemplary embodiments, compared with the first, second, third, and fourth exemplary embodiments.

That is, referring to FIG. 10, the reverse speed, the first forward speed, the second forward speed, the third forward speed, and the fourth forward speed can be achieved in a state that the third clutch CL3 is operated in the same way of the first exemplary embodiment in the fifth, sixth, seventh, and eighth exemplary embodiments.

In addition, the "EV R" range and the "EV D" range is achieved as follows.

[EV R Range]

In a state that the second output shaft 14 and the reverse speed gear RG are operably connected through the sleeve SLE3 of the third synchronizer SL3 and the engine ENG is stopped, the motor/generator 2 is operated to start at the reverse R range. when the first clutch CL1 is operated at this state, the planetary gear set PG becomes a direct-coupling state and the torque of the motor/generator 2 is transmitted to the first input shaft 8. Therefore, the EV R range is achieved.

[EV D Range]

In a state that the first output shaft 12 and the first speed gear D1 are operably connected through the sleeve SLE1 of the first synchronizer SL1 and the engine ENG is stopped, the motor/generator 2 is operated to start at the forward D range. when the first clutch CL1 is operated at this state, the planetary gear set PG becomes the direct-coupling state and the torque of the motor/generator 2 is transmitted to the first input shaft 8. Therefore, EV D range is achieved.

Since functions of the fifth, sixth, seventh, and eighth exemplary embodiments of the present invention are the same as those of the first, second, third, and fourth exemplary embodiments except achievement of "EV R" range and "EV D" range due to the third clutch CL3 selectively transmitting the torque of the engine ENG to the torque changing device, detailed description thereof will be omitted.

The exemplary embodiments of the present invention can achieve smooth start and shift by outputting the torques of the engine and the motor/generator through the planetary gear set.

In addition, slip of the clutches may be minimized and fuel mileage may be improved due to regenerative braking when deceleration.

In addition, since the torque of the motor/generator assists driving of the vehicle when acceleration, acceleration performance may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission apparatus for a vehicle comprising:
    an input device including:
        a first input shaft selectively receiving torque from a plurality of power sources and provided with at least one input gear fixedly disposed thereon; and
        a second input shaft disposed concentrically with the first input shaft, selectively receiving torque from the plurality of power sources, and provided with at least one input gear fixedly disposed thereon;
    a first speed output unit including:
        a first output shaft disposed in parallel with the first and second input shafts;
        more than two speed gears of the first output shaft engaged respectively with the at least one input gear on the first shaft and the at least one input gear of the second input shaft and rotatably disposed on the first output shaft; and
        first one or more synchronizers operably connecting the more than two speed gears to the first output shaft selectively;
    a second speed output unit including:
        a second output shaft disposed in parallel with the first and second input shafts;

at least one speed gear of the second output shaft engaged respectively with one of the at least one input gear on the first input shaft and the at least one input gear on the second input shaft and rotatably disposed on the second output shaft;
a reverse speed gear rotatably disposed on the second output shaft; and
second one or more synchronizers operably connecting the at least one speed gear of the second output shaft or the reverse speed gear to the second output shaft selectively; and
a reverse speed output unit including:
an idle shaft disposed in parallel with the second input shaft; and
first and second idle gears fixedly disposed on the idle shaft and engaged respectively to one input gear on the first input shaft and the reverse speed gear,
wherein the at least one input gear of the second input shaft includes a first input gear disposed on the second input shaft; and
wherein the at least one input gear of the first input shaft includes second, third, and fourth input gears, wherein the second, third, and fourth input gears are sequentially disposed on the first input shaft
wherein the first input shaft is configured for directly receiving or selectively receiving, through a first clutch, the torque from the plurality of power sources; and
wherein the second input shaft is disposed without rotational interference with the first input shaft, and configured for selectively receiving the torque from one power source among the plurality of power sources through a second clutch.

2. The power transmission apparatus of claim 1, wherein the plurality of power sources are an engine and a motor/generator.

3. The power transmission apparatus of claim 1, wherein the first speed output unit comprises:
the first output shaft disposed in parallel with the first and second input shafts;
the more than two speed gears including:
a first speed gear engaged with the second input gear and rotatably disposed on the first output shaft;
a second speed gear engaged with the first input gear and rotatably disposed on the first output shaft;
a third speed gear engaged with the fourth input gear and rotatably disposed on the first output shaft; and
the first one or more synchronizers including:
a first synchronizer operably connecting the first speed gear or the third speed gear to the first output shaft selectively; and
a second synchronizer operably connecting the second speed gear to the first output shaft selectively.

4. The power transmission apparatus of claim 1, wherein the second speed output unit comprises:
the second output shaft disposed in parallel with the first and second input shafts;
the at least one speed gear including:
a fourth speed gear engaged with the first input gear and rotatably disposed on the second output shaft;
the reverse speed gear operably connected to the reverse speed output unit and rotatably disposed on the second output shaft; and
the second one or more synchronizers including:
a third synchronizer operably connecting the fourth speed gear or the reverse speed gear to the second output shaft selectively.

5. The power transmission apparatus of claim 1, wherein the reverse speed output unit comprises:
the idle shaft disposed in parallel with the second input shaft;
the first idle gear engaged with the third input gear and fixedly disposed on the idle shaft; and
the second idle gear engaged with the reverse speed gear and fixedly disposed on the idle shaft.

6. The power transmission apparatus of claim 1, wherein the input device comprises:
the first input shaft directly receiving or selectively receiving through a first clutch the torque from the plurality of power sources and provided with first, second, and third input gears sequentially disposed thereon; and
the second input shaft disposed without rotational interference with the first input shaft, selectively receiving the torque from one power source among the plurality of power sources through a second clutch, and provided with a fourth input gear.

7. The power transmission apparatus of claim 6, wherein the first speed output unit comprises:
the first output shaft disposed in parallel with the first and second input shafts;
the more than two speed gears including:
a first speed gear engaged with the third input gear and rotatably disposed on the first output shaft;
a second speed gear engaged with the fourth input gear and rotatably disposed on the first output shaft;
a third speed gear engaged with the first input gear and rotatably disposed on the first output shaft; and
the first one or more synchronizers including:
a first synchronizer operably connecting the first speed gear or the third speed gear to the first output shaft selectively; and
a second synchronizer operably connecting the second speed gear to the first output shaft selectively.

8. The power transmission apparatus of claim 6, wherein the second speed output unit comprises:
the second output shaft disposed in parallel with the first and second input shafts;
the at least one speed gear including:
a fourth speed gear engaged with the fourth input gear and rotatably disposed on the second output shaft; and
the reverse speed gear operably connected to the reverse speed output unit and rotatably disposed on the second output shaft;
the second one or more synchronizers including:
a third synchronizer operably connecting the fourth speed gear or the reverse speed gear to the second output shaft selectively.

9. The power transmission apparatus of claim 6, wherein the reverse speed output unit comprises:
the idle shaft disposed in parallel with the second input shaft;
the first idle gear engaged with the second input gear and fixedly disposed on the idle shaft; and
the second idle gear engaged with the reverse speed gear and fixedly disposed on the idle shaft.

10. The power transmission apparatus of claim 1, further comprising a torque changing device being a planetary gear set having first, second, and third rotation elements, changing the torque from the plurality of power sources, and directly transmitting changed torque to the first input shaft of the input device or selectively transmitting the changed torque to the first input shaft or the second input shaft.

11. The power transmission apparatus of claim 10, wherein the torque changing device is a double pinion planetary gear set including a sun gear being the first rotation element and directly connected to one power source, a planet carrier being the second rotation element, directly connected to another power source, and selectively connected to the first and second input shafts respectively through first and second clutches, and a ring gear being the third rotation element and directly connected to the first input shaft.

12. The power transmission apparatus of claim 10, wherein the torque changing device is a double pinion planetary gear set including a planet carrier being the first rotation element and directly connected to one power source, a sun gear being the second rotation element, directly connected to another power source, and selectively connected to the first and second input shafts respectively through first and second clutches, and a ring gear being the third rotation element and directly connected to the first input shaft.

13. The power transmission apparatus of claim 10, wherein the torque changing device is a single pinion planetary gear set including a sun gear being the first rotation element and directly connected to one power source, a ring gear being the second rotation element, directly connected to another power source, and selectively connected to the first and second input shafts respectively through first and second clutches, and a planet carrier being the third rotation element and directly connected to the first input shaft.

14. The power transmission apparatus of claim 10, wherein the torque changing device is a single pinion planetary gear set including a ring gear being the first rotation element and directly connected to one power source, a sun gear being the second rotation element, directly connected to another power source, and selectively connected to the first and second input shafts respectively through first and second clutches, and a planet carrier being the third rotation element and directly connected to the first input shaft.

15. The power transmission apparatus of claim 10, wherein the torque changing device is a double pinion planetary gear set including a sun gear being the first rotation element and directly connected to one power source, a planet carrier being the second rotation element, selectively connected to another power source, and selectively connected to the first and second input shafts respectively through first and second clutches, and a ring gear being the third rotation element and directly connected to the first input shaft, and
    wherein a third clutch is disposed between the second rotation element and the another power source.

16. The power transmission apparatus of claim 10, wherein the torque changing device is a double pinion planetary gear set including a planet carrier being the first rotation element and directly connected to one power source, a sun gear being the second rotation element, selectively connected to another power source, and selectively connected to the first and second input shafts respectively through first and second clutches, and a ring gear being the third rotation element and directly connected to the first input shaft, and
    wherein a third clutch is disposed between the second rotation element and the another power source.

17. The power transmission apparatus of claim 10, wherein the torque changing device is a single pinion planetary gear set including a sun gear being the first rotation element and directly connected to one power source, a ring gear being the second rotation element, selectively connected to another power source, and selectively connected to the first and second input shafts respectively through first and second clutches, and a planet carrier being the third rotation element and directly connected to the first input shaft, and
    wherein a third clutch is disposed between the second rotation element and the another power source.

18. The power transmission apparatus of claim 10, wherein the torque changing device is a single pinion planetary gear set including a ring gear being the first rotation element and directly connected to one power source, a sun gear being the second rotation element, selectively connected to another power source, and selectively connected to the first and second input shafts respectively through first and second clutches, and a planet carrier being the third rotation element and directly connected to the first input shaft, and
    wherein a third clutch is disposed between the second rotation element and the another power source.

* * * * *